(12) United States Patent
Taji et al.

(10) Patent No.: US 6,208,058 B1
(45) Date of Patent: Mar. 27, 2001

(54) AUTOMOTIVE ALTERNATOR

(75) Inventors: Ryoichi Taji; Kyoko Higashino; Yoshihito Asao, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/478,544

(22) Filed: Jan. 6, 2000

(30) Foreign Application Priority Data

Jul. 15, 1999 (JP) .................................................. 11-201696

(51) Int. Cl.⁷ ............................. H02K 17/00; H02K 9/02
(52) U.S. Cl. ............................. 310/201; 310/108; 310/71
(58) Field of Search .................................... 310/179, 195, 310/201, 89, 68 B; 29/596–598

(56) References Cited

U.S. PATENT DOCUMENTS

| 2,407,935 | * | 9/1946 | Perfetti et al. | 310/201 |
| 4,309,634 | * | 1/1982 | Koroly et al. | 310/201 |
| 4,952,829 | * | 8/1990 | Armbruster et al. | 310/68 D |
| 5,682,070 | * | 10/1997 | Adachi et al. | 310/71 |
| 5,965,965 | * | 10/1999 | Umeda et al. | 310/52 |
| 6,051,906 | * | 4/2000 | Umeda et al. | 310/179 |

FOREIGN PATENT DOCUMENTS 62-272836    11/1987    (JP) ................................. H02K/3/04

* cited by examiner

*Primary Examiner*—Tran Nguyen
(74) *Attorney, Agent, or Firm*—Sughrue, Mion, Zinn, Macpeak & Seas, PLLC

(57) ABSTRACT

An automotive alternator includes a shaft supported in a pair of brackets so as to rotate freely, a rotor secured to the shaft, a stator provided with a cylindrical stator core having a plurality of slots whose grooves extend in an axial direction of the stator core disposed circumferentially around the inner circumferential surface thereof and a stator coil wound into the slots, the stator core being secured to the pair of brackets so as to envelop the rotor, and a rectifier disposed within the pair of brackets so as to be positioned at the rear end of the rotor, wherein the stator coil is constructed by inserting a plurality of coil segments into each of the slots so as to align in rows in the radial direction within the slots and connecting the tips of each of the coil segments projecting axially outwards from the stator core to the tips of coil segments inserted into slots a predetermined number of slots away projecting axially outwards from the stator core, and wherein the coil segments are formed into a shape such that when inserted into the slots the tips extending axially outwards from the stator core are in close proximity to and overlap radially with the tips of the coil segments inserted into slots a predetermined number of slots away projecting axially outwards from the stator core.

8 Claims, 9 Drawing Sheets

AUTOMOTIVE ALTERNATOR

BACKGROUND OF THE INVENTION

1. Field of the Invention

The present invention relates to an automotive alternator, and in particular, relates to the construction of a stator coil of an automotive alternator for suppressing damage to the insulation coated on the coil wire by eliminating three-dimensional twisting of the coil wire and for improving productivity.

2. Description of the Related Art

FIG. 11 is a cross-section showing a conventional automotive alternator.

A conventional automotive alternator includes: a Lundell-type rotor 7 mounted so as to rotate freely by means of a shaft 6 within a case 3 consisting of an aluminum front bracket 1 and an aluminum rear bracket 2; and a stator 8 secured to the inner wall of the case 3 so as to cover the outer circumference of the rotor 7.

The shaft 6 is rotatably supported by the front bracket 1 and the rear bracket 2. A pulley 4 is secured to one end of the shaft 6 to enable rotational torque from an engine to be transmitted to the shaft 6 by means of a belt (not shown).

Slip rings 9 for supplying electric current to the rotor 7 are secured to the other end of the shaft 6, and a pair of brushes 10 are housed in a brush holder 11 disposed within the case 3 so as to slide in contact with the slip rings 9. A regulator 18 for regulating the magnitude of an alternating voltage generated in the stator 8 is affixed by adhesive to a heat sink 17 attached to the brush holder 11. A rectifier 12 electrically connected to the stator 8 for rectifying an alternating current generated in the stator 8 to a direct current is mounted within the case 3. This rectifier 12 is provided with a plurality of diodes 24 arranged on a heat sink 19, and a circuit board 25 for electrically connecting each of the diodes 24 and forming predetermined circuits.

The rotor 7 includes: a rotor coil 13 for generating magnetic flux by passing electric current therethrough; and a pair of pole cores 20 and 21 disposed so as to cover the rotor coil 13 in which magnetic poles are formed by the magnetic flux generated by the rotor coil 13. The pair of pole cores 20 and 21 are made of iron, each has a plurality of claw-shaped magnetic poles 22 and 23 projecting from an outer circumferential edge thereof spaced at even angular pitch circumferentially, and the pole cores 20 and 21 are secured to the shaft 6 facing each other so that the claw-shaped magnetic poles 22 and 23 intermesh. In addition, fans 5 are secured to both axial ends of the rotor 7.

The stator 8 includes: a stator core 15; and a stator coil 16 composed of wire wound around the stator core 15 in which an alternating current is generated by changes in the magnetic flux from the rotor 7 as the rotor 7 rotates.

In an automotive alternator constructed in this manner, an electric current is supplied from a battery (not shown) by means of the brushes 10 and the slip rings 9 to the rotor coil 13, and the magnetic flux is generated. The claw-shaped magnetic poles 22 of the pole core 20, are magnetized to N polarities by the magnetic flux, and the claw-shaped magnetic poles 23 of the pole core 21 are magnetized to S polarities by the magnetic flux. At the same time, the rotational torque of the engine is transmitted to the shaft 6 by means of the belt and the pulley 4, and the rotor 7 is rotated. Thus, a rotating magnetic field is imparted to the stator coil 16 and electromotive force is generated in the stator coil 16. This alternating electromotive force is rectified to a direct current by means of the rectifier 12, its voltage is regulated by the regulator 18, and the battery is recharged.

Next, the stator coil construction applied to a conventional automotive alternator will be explained with reference to FIG. 12. Moreover, FIG. 12 is a partial enlargement of a conventional stator viewed from the inner circumferential side.

The stator core 15 is formed into a cylindrical shape and a plurality of slots 15a whose grooves extend in the axial direction are disposed at even angular pitch around the circumference thereof so as to be open on the inner circumferential side. The stator coil 16 is constructed by connecting into one unit the starting end wires (or the finishing end wires) of three coils respectively corresponding to three phases prepared by inserting wire in a wave shape successively into every third slot 15a. Moreover, the slots 15a into which the strands of wire of each of the three coils are inserted are offset from those of each of the other coils by one slot. Further, the wire extends axially outwards from the slots 15a and constitutes front-end and rear-end coil end portions 16a and 16b.

Next, the construction of the stator coil 16 will be explained in detail.

Coil segments 30 are formed by shaping strands of copper wire coated with insulation into a general U-shape, and as shown in FIGS. 13 and 14, each includes a pair of straight portions 30a, a pair of oblique portions 30b each bent from a straight portion 30a and extending in a straight line, and a return portion 30c joining the pair of oblique portions 30b by twisting and bending the wire so as to turn back around.

Now, the coil segments 30 are inserted from the rear end into pairs of slots 15a three slots apart. At this time, the coil segments 30 are inserted into the slots 15a such that the strands of wire are folded back at the return portions 30c, from the inner circumferential side to the outer circumferential side, for example. Then, the straight portions 30a of the coil segments 30 projecting towards the front end from the slots 15a are bent circumferentially outwards, as shown in FIG. 15, and the ends thereof are additionally bent parallel to the straight portions 30a. Next, adjacent ends of the coil segments 30 are joined to prepare one phase of the coil. At this time, the adjacent ends of the coil segments 30 are stacked radially and joined, and constructed such that the strands of wire appear to be folded back from the inner circumferential side to the outer circumferential side at the joined portions.

The other two phases of the coil are prepared similarly. For each of the phases of the coil, the slots 15a into which the coil segments 30 are inserted are offset by one slot from each of the other phases.

The stator coil 16 is constructed by connecting the three phases of coil prepared in this manner in a three-phase alternating-current connection such as a Y connection or a delta connection.

In the coil end portions 16a and 16b of a stator coil 16 constructed in this manner, because the wire is formed so as to bend back from the inner circumferential side to the outer circumferential side at the apex, adjacent strands of wire are neatly arranged in the circumferential direction in the vicinity of the apexes, as shown in FIGS. 17 and 18. Moreover, FIG. 17 is a diagram showing an example of a wire array in a rear-end coil end portion, and FIG. 18 is a diagram showing another example of a wire array in a rear-end coil end portion. By adopting constructions of this kind, the coil end portions become practically the same shape around the entire circumference, improving alignment.

Moreover, in the above conventional example, all of the straight portions 30a projecting towards the front end from the slots 15a were bent circumferentially outwards, but some of the straight portions 30a projecting towards the front end from the slots 15a may be bent circumferentially inwards and the tips thereof additionally bent parallel to the straight portions 30a, as shown in FIG. 16.

A conventional stator coil 16 applied to an automotive alternator is constructed by inserting the straight portions 30a of many generally U-shaped coil segments 30 into predetermined slots 15a, bending the straight portions 30a projecting from the slots 15a circumferentially in the vicinity of the end surface of the stator core 15, additionally bending the tips of the straight portions 30a parallel to the axial direction of the stator core 15 at the connecting position, and joining the tips of the straight portions 30a to form connections.

Thus, bending and twisting is applied to the strands of the stator coil 16 both before and after insertion into the slots, increasing damage to the coil, as well as increasing the number of production steps and reducing productivity.

Furthermore, because the coil segments 30 are in close proximity to each other when inserted into the slots 15a, the bending operation is made difficult after insertion, reducing productivity.

Because the return portions 30c of the coil segments 30 are formed into a three-dimensional twist, insulation is easily damaged during formation of the coil segments, giving rise to electrical faults, and tolerance of physical contact between adjacent coil strands is low.

Furthermore, due to the need to accurately insert the coil segments 30 into predetermined positions within the slots 15a, a high degree of machining precision has been required in the coil segments 30, particularly in the twisting of the return portions 30c, making work difficult. In addition, the coil segments 30 are chucked after insertion in order to bend the tips of the coil segments, but because the shape of the coil segments 30 is difficult to chuck, the chucking is unstable, and there is a risk of damaging the teeth of the stator core 15 during the process of bending the coil segments circumferentially after insertion.

Furthermore, in the coil array shown in FIG. 18, because it is necessary to position one of the straight portions 30a of a coil segment 30 in the radially outermost position within a slot 15a and the other straight portion 30a in a position one row inwards from the radially outermost position within a slot 15a three slots away and insert them parallel to the axial direction of the stator core 15, it is difficult to insert many coil segments 30 simultaneously, reducing productivity. This is considered to be due to the fact that the coil segments 30 have no portions suitable for chucking because the regions of the oblique portions 30b and return portions 30c of the coil segments 30 have complex shapes, and also to the fact that the pitch and degree of parallelism between pairs of straight portions 30a cannot be formed with high precision.

Additionally, because the coil segments 30 are arranged in an unstable state in close proximity to each other when inserted in the slots 15a, it is difficult to weld the tips of the coil segments 30 to each other, making work time long and increasing costs.

SUMMARY OF THE INVENTION

The present invention aims to solve the above problems and an object of the present invention is to provide a high-quality, low-cost automotive alternator by adopting a coil segment shape which eliminates twists and reduces the number of bends, thereby suppressing damage to the coil and to the insulation and enabling the stator coil to be produced inexpensively.

In order to achieve the above object, according to one aspect of the present invention, there is provided an automotive alternator including:

a shaft supported in a pair of brackets so as to rotate freely;

a rotor secured to the shaft;

a stator provided with a cylindrical stator core having a plurality of slots whose grooves extend in an axial direction of the stator core disposed circumferentially around the inner circumferential surface thereof and a stator coil wound into the slots, the stator being secured to the pair of brackets so as to envelop the rotor; and a rectifier disposed within the pair of brackets so as to be positioned at the rear end of the rotor, wherein the stator coil is constructed by inserting a plurality of coil segments into each of the slots so as to align in rows in the radial direction within the slots and connecting the tips of each of the coil segments projecting axially outwards from the stator core to the tips of the coil segments inserted into slots a predetermined number of slots away projecting axially outwards from the stator core, and wherein the coil segments are formed into a shape such that when inserted into the slots the tips extending axially outwards from the stator core are in close proximity to and overlap radially with the tips of the coil segments inserted into slots the predetermined number of slots away projecting axially outwards from the stator core.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will now be described in detail by referring to the accompanying drawings.

Embodiment 1

Figure 1:
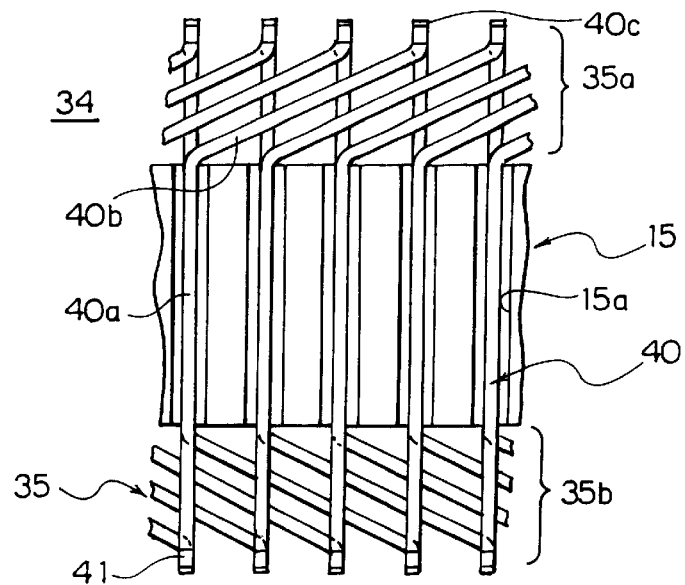
FIG. 1 is a partial enlargement of a stator applied to an automotive alternator according to Embodiment 1 of the present invention viewed from the inner circumferential side.
Figure 2:
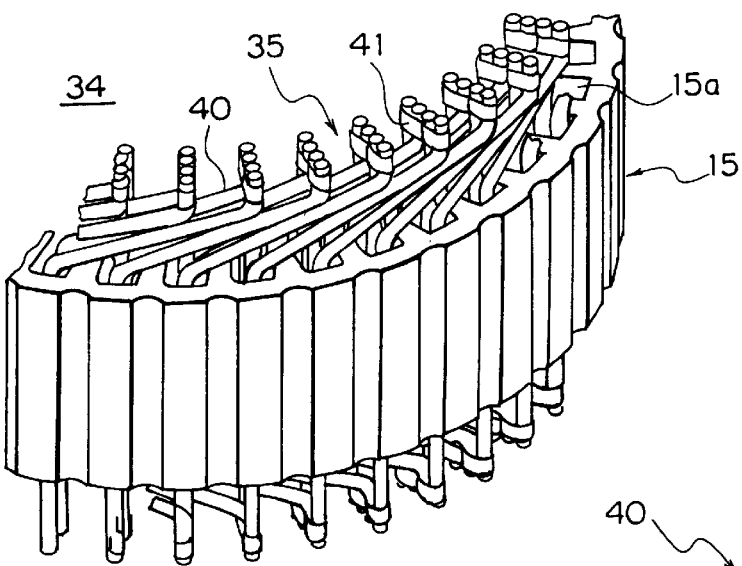
FIG. 2 is a perspective showing part of the stator applied to the automotive alternator according to Embodiment 1 of the present invention.

FIG. 1 is a partial enlargement of a stator applied to an automotive alternator according to Embodiment 1 of the present invention viewed from the inner circumferential side, and FIG. 2 is a perspective showing part of the stator applied to the automotive alternator according to Embodiment 1 of the present invention.

In FIGS. 1 and 2, a stator 34 includes a stator core 15 and a stator coil 35 wound onto the stator core 15. The stator core 15 is formed into a cylindrical shape and a plurality of slots 16a whose grooves extend in the axial direction are disposed at even angular pitch around the circumference thereof so as to be open on the inner circumferential side. Furthermore, the stator coil 35 is constructed by connecting into one unit the starting end wires (or the finishing end wires) of three coils respectively corresponding to three phases prepared by inserting wire in a wave shape successively into every third slot 15a. Moreover, the slots 15a into which the strands of wire of each of the three coils are inserted are offset from those of each of the other coils by one slot. Furthermore, the wire extends axially outwards from the slots 15a and constitutes front-end and rear-end coil end portions 35a and 35b.

Next, the construction of the stator coil 35 will be explained in detail.

Figure 3:
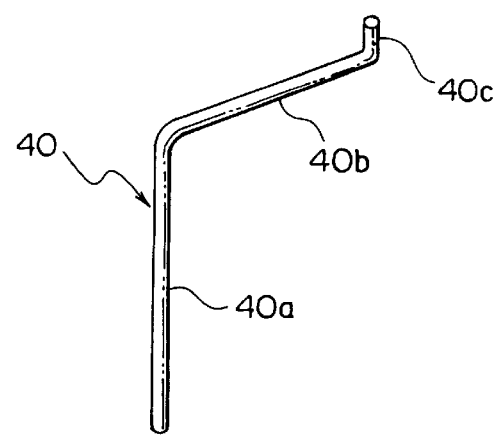
FIG. 3 is a perspective showing a coil segment applied to the automotive alternator according to Embodiment 1 of the present invention.

The coil segments 40 are formed by bending wire composed of insulated copper material, and each includes a first straight portion 40a, a second straight portion 40b connected to the first straight portion 40a by means of a single bend, and a third straight portion 40c parallel to the first straight portion 40a connected to the second straight portion 40b by means of a single bend, as shown in FIG. 3. Moreover, the distance between the axes of the first and third straight portions 40a and 40c is approximately three times the pitch of the slots 15a.

Figure 4:
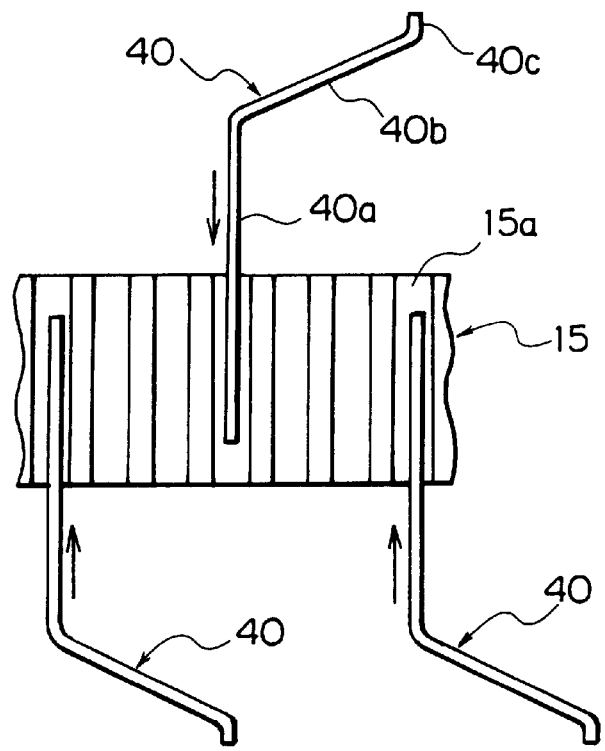
FIG. 4 is a diagram explaining the method for manufacturing the stator applied to the automotive alternator according to Embodiment 1 of the present invention.
Figure 5:
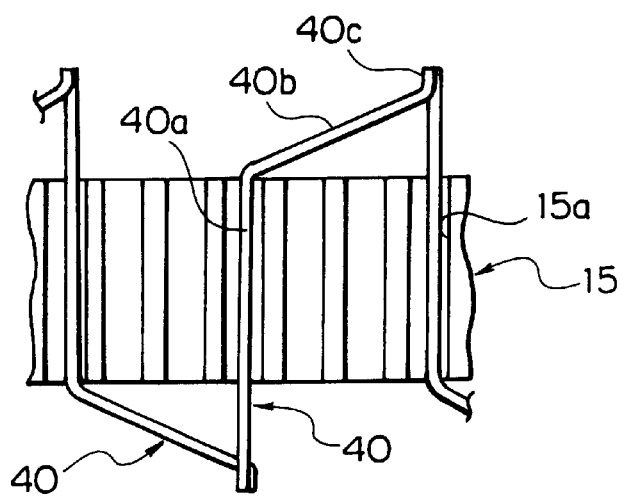
FIG. 5 is another diagram explaining the method for manufacturing the stator applied to the automotive alternator according to Embodiment 1 of the present invention.

The coil segments 40 are inserted into every third slot 15a from both the front end and the rear end as shown in FIG. 4. In Embodiment 1, the first straight portions 40a of four coil segments 40 are inserted into each slot 15a so as to align in a row in the radial direction. Then, as shown in FIG. 5, the tips of the first straight portions 40a of the coil segments 40 inserted into the slots 15a from the rear end are stacked radially with the tips of the third straight portions 40c of the coil segments 40 inserted from the front end into slots 15a three slots away, and are temporarily fastened by metal cramps 41 (not shown). Similarly, the tips of the first straight portions 40a of the coil segments 40 inserted into the slots 15a from the front end are stacked radially with the tips of the third straight portions 40c of the coil segments 40 inserted from the rear end into slots 15a three slots away, and are temporarily fastened by metal cramps 41 (not shown). Then, the tips of first and third straight portions 40a and 40c are joined to each other by welding to prepare one phase of coil.

Two other phases of coil are prepared in a similar manner. For each of the phases of the coil, the slots 15a into which the coil segments 30 are inserted are offset by one slot from each of the other phases.

The stator coil 35 is constructed by connecting the three phases of coil prepared in this manner in a three-phase alternating-current connection such as a Y connection or a delta connection.

In the coil end portions 35a and 35b of the stator coil 35 constructed in this manner, because the tips of the first and third straight portions 40a and 40c of adjacent coil segments 40 are stacked radially and joined to each other, the wire is formed so as to fold (or turn) back from the inner circumferential side to the outer circumferential side at the apex, for example, and adjacent strands of wire are neatly arranged in the circumferential direction in the vicinity of the apexes. By adopting a construction of this kind, the coil end portions 35a and 35b become practically the same shape around the entire circumference, improving alignment.

Now, the method for inserting the coil segments 40 into the slots 15a will be explained with reference to FIG. 6.

Figure 6:
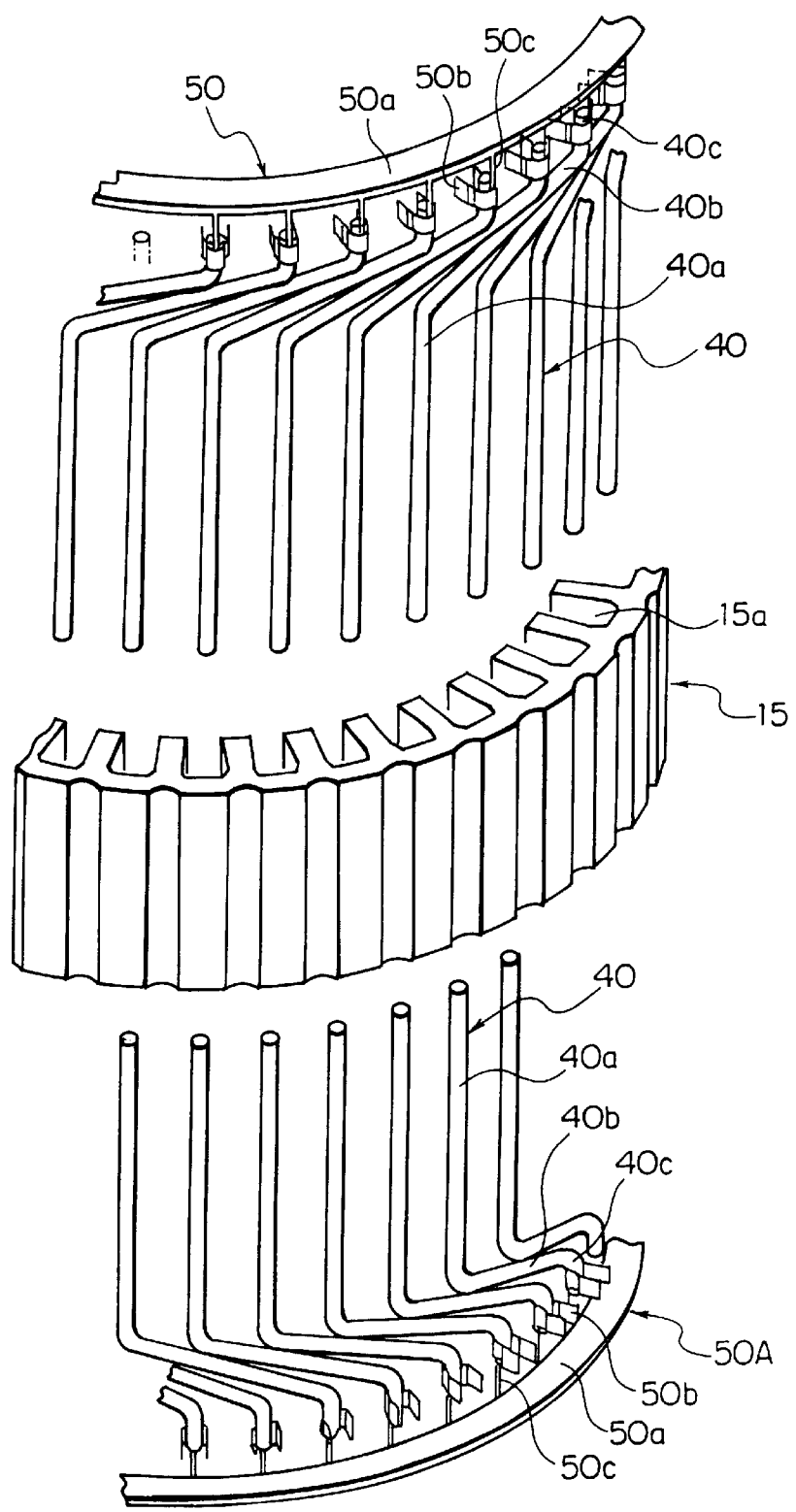
FIG. 6 is a third diagram explaining the method for manufacturing the stator applied to the automotive alternator according to Embodiment 1 of the present invention.

In FIG. 6, a coil segment insertion jig 50 is made of metal such as copper, and includes a ring-shaped support portion 50a and a plurality of cramp portions 50b connected to outer circumferential edge portions of the support portion 50a at even angular pitch circumferentially by means of connecting portions 50c. The cramp portions 50b are disposed at the same pitch as the slots 15a such that the open sides thereof face radially inwards to the support portion 50a. Furthermore, the cramp portions 50b are each formed in a U-shape for housing two coil segments 40 aligned radially.

Furthermore, a coil segment insertion jig 50A is constructed in the same way as the coil segment insertion jig 50 except that the cramp portions 50b are connected to inner circumferential edge portions of the support portion 50a by means of connecting portions 50c such that the open sides thereof face radially outwards to the support portion 50a.

Moreover, the cramp portions 50b become metal cramps 41 by cutting the connecting portions 50c.

First, the tips of the third straight portions 40c of the coil segments 40 are inserted into the cramp portions 50b, and the position of the coil segments 40 is adjusted as the coil segments 40 are secured by cramping the cramp portions 50b. This operation is repeated to obtain coil segment insertion jigs 50 and 50A having a coil segment 40 secured in each of the cramp portions 50b.

Next, as shown in FIG. 6, the coil segment insertion jigs 50 and 50A are brought close to the stator core 15 from both axial ends of the stator core 15 and the first straight portions 40a of each of the coil segments 40 are inserted into the slots 15a.

Then, the first straight portions 40a of each of the coil segments 40 secured to the coil segment insertion jig 50 project from the stator core 15 and the tips thereof are housed in the cramp portions 50b of the coil segment insertion jig 50A. On the other hand, the first straight portions 40a of each of the coil segments 40 secured to the coil segment insertion jig 50A project from the stator core 15 and the tips thereof are housed in the cramp portions 50b of the coil segment insertion jig 50. At this point, each of the cramp portions 50b is cramped, integrally securing the tips of the first and third straight portions 40a and 40c of adjacent coil segments 40 to each other. Then, each of the connecting portions 50c are cut, and the tips of first and third straight portions 40a and 40c integrated by the cramp portions 50b are joined by welding.

A stator 34 is obtained by further repeating the above operation using coil segment insertion jigs 50 and 50A having different radii.

In Embodiment 1, because the coil segments 40 constituting the stator coil 35 include the first straight portion 40a, the second straight portion 40b connected to the first straight portion 40a by means of a single bend, and the third straight portion 40c parallel to the first straight portion 40a connected to the second straight portion 40b by means of a single bend, only two-dimensional bending is required and only in two places, eliminating the need for three-dimensional bending and twisting such as in conventional coil segments 30.

As a result, because coil damage is reduced, tolerance of physical contact between adjacent coil strands is improved. Because damage to the insulation is suppressed, the occurrence of electrical faults is suppressed. Because the number of steps required to produce the coil segments 40 is reduced, the production of the coil segments 40 is improved. Because the coil segments 40 are produced to a high degree of dimensional precision, positioning of the coil segments 40 is facilitated, and a high degree of parallelism is ensured between first and third straight portions 40a and 40c being connected, eliminating the need for extra adjustment operations, thereby improving the production of the stator coil. In addition, because the coil segments 40 can be inserted into the slots 15a by chucking the third straight portions 40c as shown in FIG. 6, insertion of the coil segments 40 into the slots 15a is improved, improving the production of the stator coil.

In Embodiment 1, because the first and third straight portions 40a and 40c of the coil segments 40 are constructed so as to be parallel to each other and to have an axial separation three times the pitch of the slots 15a, the tips of the first straight portions 40a (or the third straight portions 40c) of the coil segments 40 are in close proximity to and overlap radially with the tips of the third straight portions 40c (or the first straight portions 40a) of the coil segments 40 inserted into slots 15a three slots away. Thus, the tips of the first and third straight portions 40a and 40c of the coil segments 40 can be joined to each other by welding without having to perform adjusting operations involving bending after the coil segments 40 have been inserted into the slots 15a.

As a result, because damage to the coil is reduced, tolerance to physical contact between the strands of the coil is improved. Because damage to the insulation is suppressed, the occurrence of electrical faults is suppressed. Furthermore, damage to the teeth as a result of bending after the insertion of the coil segments is prevented. In addition, because the number of steps in the production of the stator coil 35 is reduced, production of the stator coil is improved.

Moreover, in Embodiment 1 above, two pairs of coil segment insertion jigs 50 and 50A having different radii were used, but by arranging the cramp portions 50b circumferentially to form two rows radially, the coil segments 40 can be inserted into all of the slots at once using one pair of coil segment insertion jigs.

Embodiment 2

Figure 7:
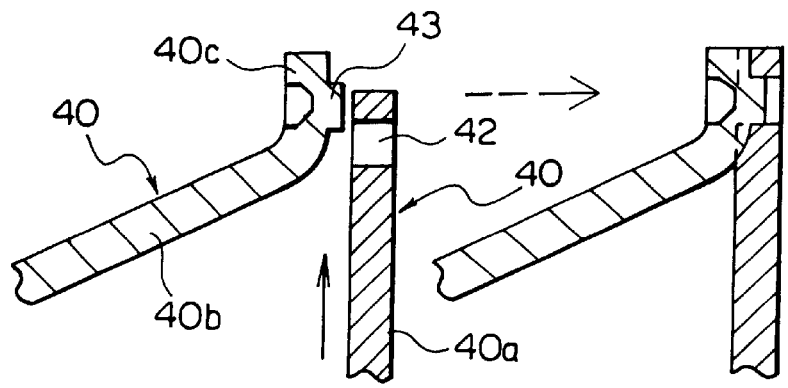
FIG. 7 is a diagram explaining a method for temporarily securing coil segments in Embodiment 2 of the present invention.

In Embodiment 1 above, the tips of the first and third straight portions 40a and 40c of adjacent coil segments 40 were temporarily secured by metal cramps 41 then joined to each other by welding, but as shown in FIG. 7, the same effects are achieved in Embodiment 2 by disposing openings 42 functioning as engaging portions in the tips of the first straight portions 40a, disposing protrusions 43 functioning as engaged portions in the tips of the third straight portions 40c, and temporarily securing the tips of the first and third straight portions 40a and 40c of adjacent coil segments 40 by pressing the protrusions 43 into the openings 42.

Embodiment 3

Figure 8:
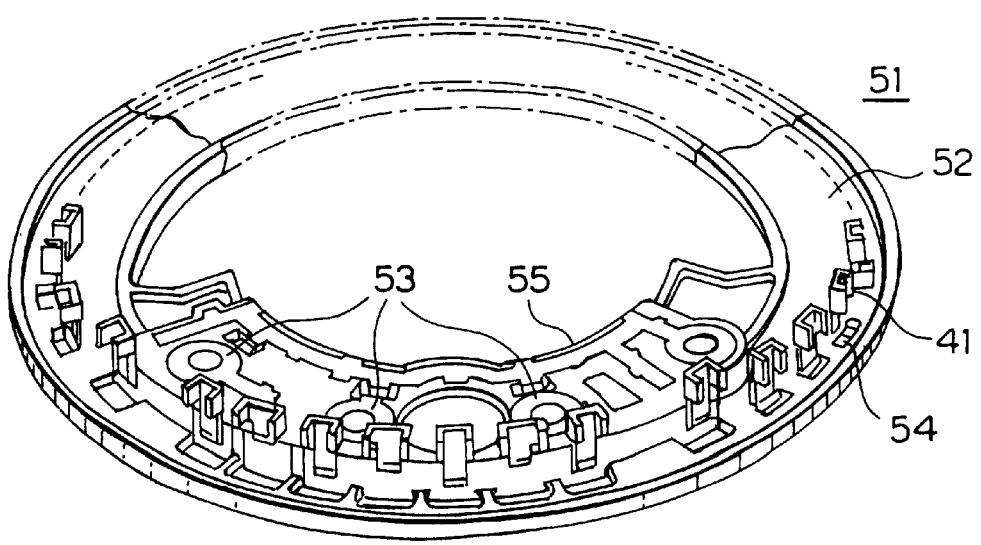
FIG. 8 is a perspective schematically showing a coil securing member applied to an automotive alternator according to Embodiment 3 of the present invention.
Figure 9:
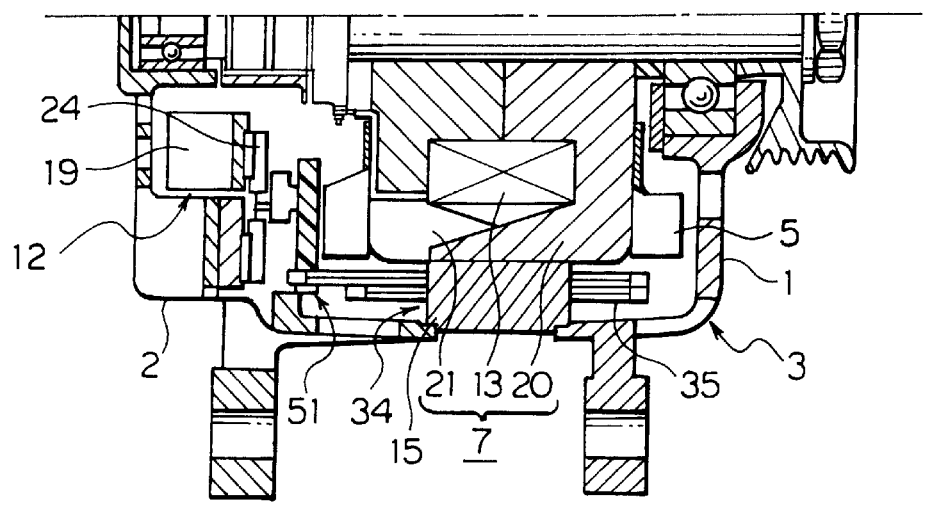
FIG. 9 is a cross-section showing an automotive alternator according to Embodiment 3 of the present invention.

FIG. 8 is a perspective schematically showing a stator coil securing member applied to an automotive alternator according to Embodiment 3 of the present invention, and FIG. 9 is a cross-section showing the automotive alternator according to Embodiment 3 of the present invention.

In FIG. 8, a coil securing member 51 is constructed by forming into a ring shape by molding iron insert-conductors (not shown) and metal cramps 41 functioning as metal stays in polyphenylene sulfide (PPS) resin. Some of the insert-conductors are exposed from the ring-shaped resin body 52 and constitute connecting terminals 53 for electrical connection to terminals of diodes 24 disposed on the heat sink 19. Cramps 41 are disposed to stand with predetermined spacing circumferentially on outer circumferential edge portions of the resin body 52. Apertures 54 for the insertion of coil segments 40 are disposed through the resin body 52 at the positions where the cramps 41 stand. In addition, predetermined metal cramps 41 are connected to the connecting terminals 53 by the insert conductors in order to electrically connect the stator coil 35 to the rectifier 12.

In this coil securing member 51, a circuit board portion 55 equivalent to the circuit board 25 of the rectifier 12 is integrally formed into the resin body 52 and supports the rear-end coil end portions of the stator coil 35.

Moreover, the rest of the construction is the same as the construction of Embodiment 1 above.

In Embodiment 3, first the tips of the third straight portions 40c of the coil segments 40 are inserted into the cramp portions 50b, and the position of the coil segments 40 is adjusted as the coil segments 40 are secured by cramping the cramp portions 50b. This operation is repeated to obtain a coil segment insertion jig 50 having a coil segment 40 secured in each of the cramp portions 50b.

Similarly, the tips of third straight portions 40c of the coil segments 40 are inserted through the apertures 54 into the metal cramps 41, and the position of the coil segments 40 is adjusted as the coil segments 40 are secured by cramping the metal cramps 41. This operation is repeated to obtain a coil securing member 51 having a coil segment 40 secured in each of the metal cramps 41.

Next, the coil segment insertion jig 50 and the coil securing member 51 are brought close to the stator core 15 from both axial ends of the stator core 15 and the first straight portions 40a of each of the coil segments 40 are inserted into the slots 15a.

Then, the first straight portions 40a of each of the coil segments 40 secured to the coil segment insertion jig 50 project from the stator core 15, and the tips thereof pass through the apertures 54 and are housed in the metal cramps 41 of the coil securing member 51. On the other hand, the first straight portions 40a of each of the coil segments 40 secured to the coil securing member 51 project from the stator core 15 and the tips thereof are housed in the cramp portions 50b of the coil segment insertion jig 50. At this point, each of the cramp portions 50b and the metal cramps 41 are cramped, integrally securing the tips of the first and third straight portions 40a and 40c of adjacent coil segments 40 to each other. Then, each of the connecting portions 50c are cut, and the tips of first and third straight portions 40a and 40c integrated by the cramp portions 50b and the metal cramps 41 are joined by welding to obtain a stator 34.

The stator 34 prepared in this manner is installed in the case 3 as shown in FIG. 9. The stator coil 35 is electrically connected to the rectifier 12 by joining the terminals of the diodes 24 disposed on the heat sink 19 to the connecting terminals 53.

By this Embodiment 3, because the circuit board portion 55 corresponding to the circuit board 25 of the rectifier 12 is integrally formed into the resin body 52, the circuit board 25 is no longer required, enabling reductions in the number of component parts.

Furthermore, if the metal cramps 41 securing coil segments to be connected by bridging are interconnected by the insert-conductors, the bridging connection operation is no longer required and bridge connection portions are eliminated from the coil end portions, improving the alignment of the coil end portions.

Embodiment 4

Figure 10:
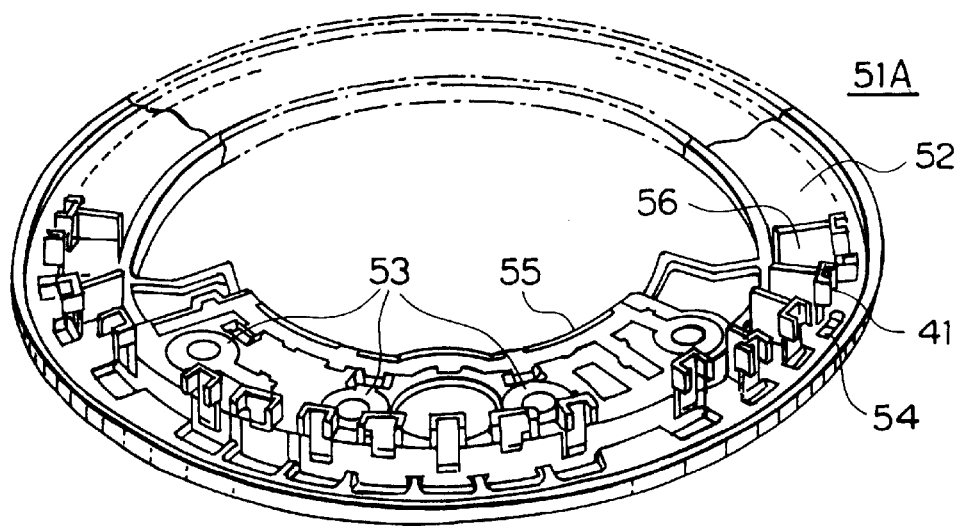
FIG. 10 is a perspective schematically showing a coil securing member applied to an automotive alternator according to Embodiment 4 of the present invention.
Figure 11:
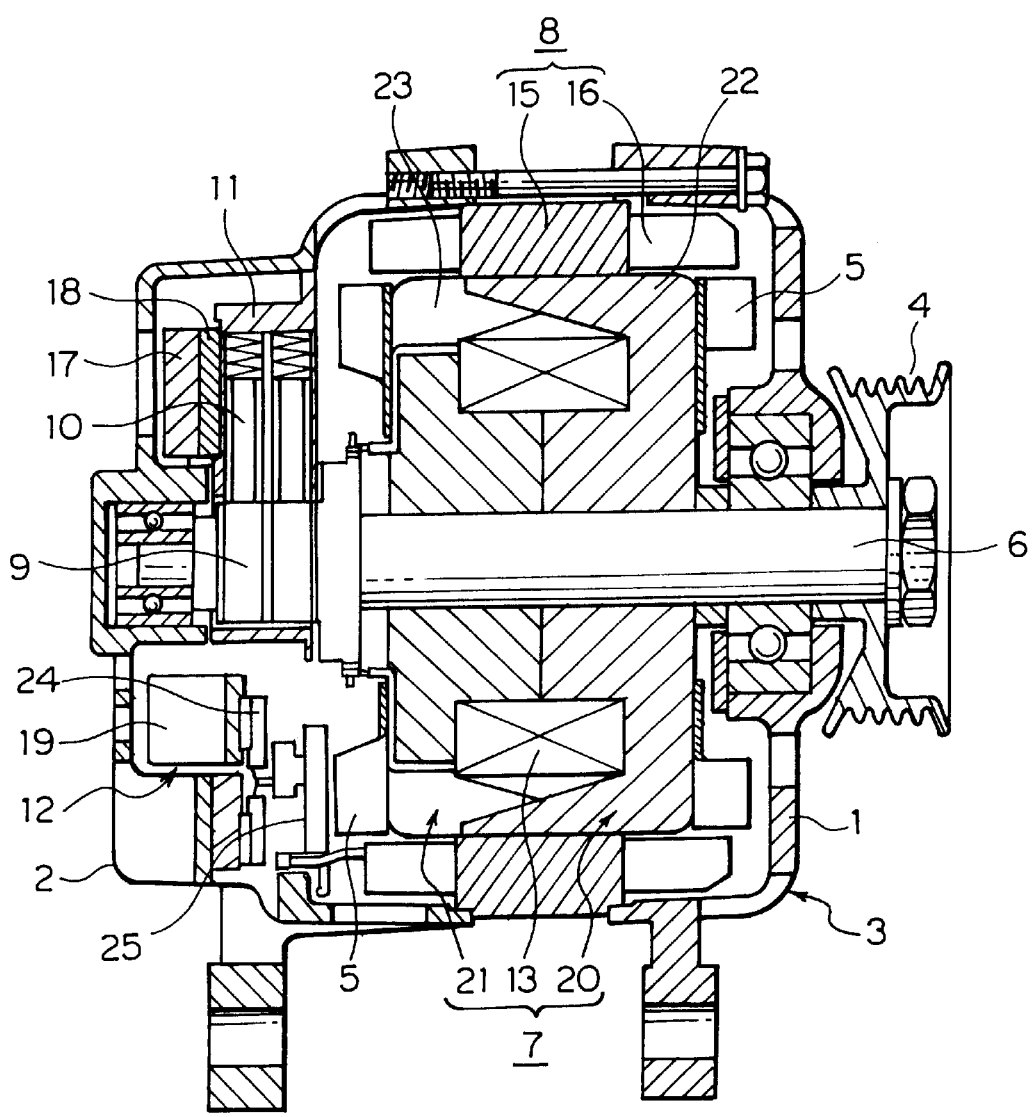
FIG. 11 is a cross-section showing a conventional automotive alternator.
Figure 12:
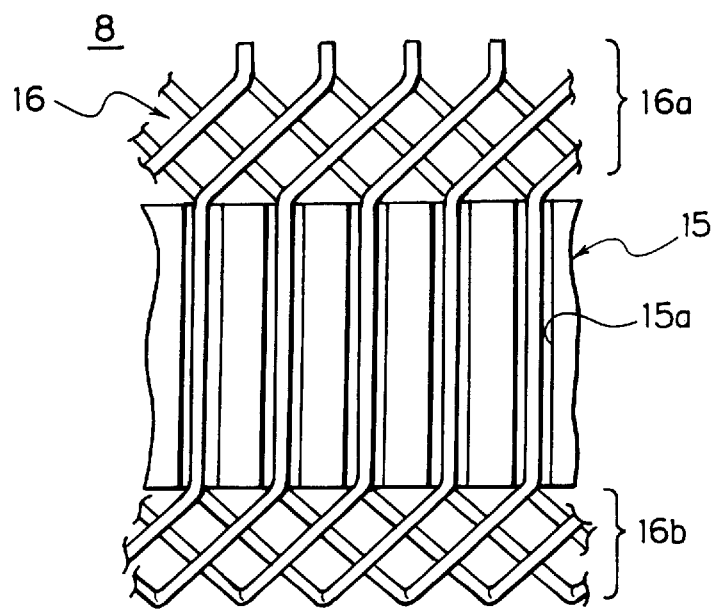
FIG. 12 is a partial enlargement of a stator applied to the conventional automotive alternator viewed from the inner circumferential side.
Figure 13:
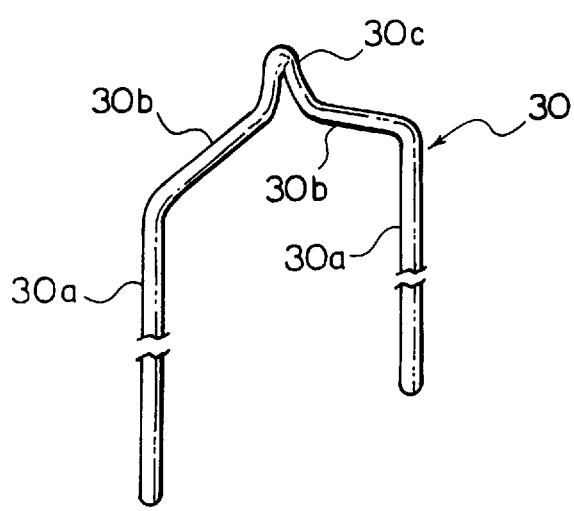
FIG. 13 is a perspective showing a coil segment applied to the conventional automotive alternator.
Figure 14:
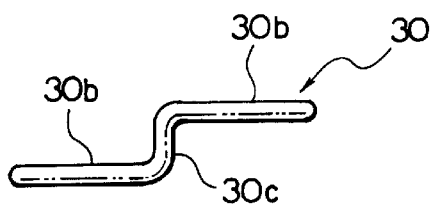
FIG. 14 is a plan showing the coil segment applied to the conventional automotive alternator.
Figure 15:
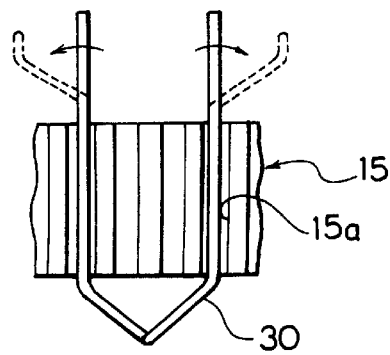
FIG. 15 is a diagram explaining a method for manufacturing the stator applied to the conventional automotive alternator.
Figure 16:
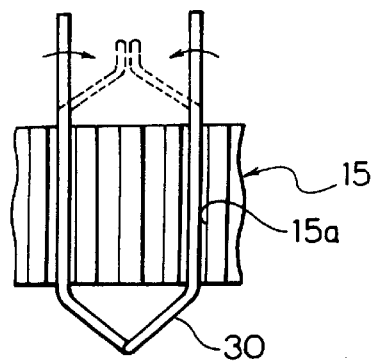
FIG. 16 is another diagram explaining a method for manufacturing the stator applied to the conventional automotive alternator.
Figure 17:
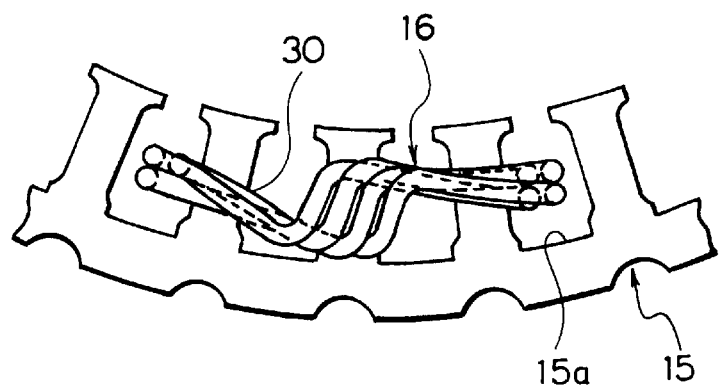
FIG. 17 is a front elevation showing an example of a stator coil array applied to the conventional automotive alternator.
Figure 18:
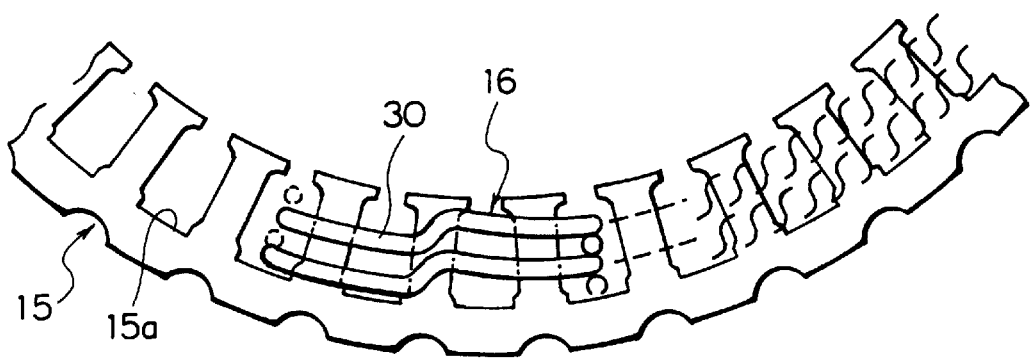
FIG. 18 is a front elevation showing another example of a stator coil array applied to the conventional automotive alternator.

In a coil securing member 51A according to Embodiment 4, heat-radiating fins 56 are integrally formed on the metal cramps 41 disposed standing on the resin body 52 as shown in FIG. 10.

Moreover, the rest of the construction is the same as the construction of Embodiment 3 above.

By Embodiment 4, because the heat-radiating fins 56 are integrally formed on the metal cramps 41, heat generated in the stator coil 35 is effectively radiated, enabling temperature increases in the stator coil 35 to be suppressed.

Moreover, in each of the above embodiments, wire material of circular cross-section was used in the coil segments, but the coil segments are not limited to wire material of circular cross-section, and wire material of rectangular cross-section may be used, for example. When wire material of rectangular cross-section was used in conventional coil segments, large internal stresses were generated by the formation of the wire material into a three-dimensionally twisted shape, leading to severe damage to the insulation and a high degree of reliability was not possible. In the present invention, because only two-dimensional bends are formed in the wire material of the coil segments, it is possible to increase reliability significantly compared to the convention even if wire material of rectangular cross-section was used in the coil segments.

Furthermore, each of the above embodiments has been explained using a three-phase automotive alternator, but the present invention is not limited to three-phase alternating current, and it goes without saying that application to single-phase alternating current or dual-phase alternating current, for example, is possible.

Because the present invention is constructed in the above manner, it exhibits the effects described below.

According to one aspect of the present invention, there is provided an automotive alternator including: a shaft supported in a pair of brackets so as to rotate freely;

a rotor secured to the shaft;

a stator provided with a cylindrical stator core having a plurality of slots whose grooves extend in an axial direction of the stator core disposed circumferentially around the inner circumferential surface thereof and a stator coil wound into the slots, the stator being secured to the pair of brackets so as to envelop the rotor; and a rectifier disposed within the pair of brackets so as to be positioned at the rear end of the rotor, wherein the stator coil is constructed by inserting a plurality of coil segments into each of the slots so as to align in rows in the radial direction within the slots and connecting the tips of each of the coil segments projecting axially outwards from the stator core to, the tips of the coil segments inserted into slots a predetermined number of slots away projecting axially outwards from the stator core, and wherein the coil segments are formed into a shape such that when inserted into the slots the tips extending axially outwards from the stator core are in close proximity to and overlap radially with the tips of the coil segments inserted into slots the predetermined number of slots away projecting axially outwards from the stator core, eliminating the need for bending of the coil segments after the coil segments have been inserted into the slots. Thus, because coil damage and damage to the insulation accompanying bending of the coil segments is reduced and the number of production steps is also reduced, an inexpensive automotive alternator with superior reliability can be provided.

Because each of the above coil segments may include a first straight portion housed in one of the slots having one end projecting from one axial end of the stator core, a second straight portion connected to the other end of the first straight portion by means of a single bend and projecting from the other axial end of the stator core, and a third straight portion connected to the second straight portion by means of a single bend and extending parallel to the first straight portion, the shape of the coil segments is simplified, and three-dimensional twisting is eliminated, enabling cost reductions and improvements to quality. In addition, chucking of the coil segments is facilitated, improving the operation of inserting the coil segments into the slots.

Because engaging portions may be disposed on the tips of the coil segments projecting axially outwards from the stator core, and engaged portion may be disposed on the tips of the coil segments inserted into slots a predetermined number of slots away projecting axially outwards from the stator core, whereby the engaging portions are engaged in the engaged portions to temporarily secure the coil segments to each other after the coil segments are inserted into the slots, production of the stator core is improved.

Because a coil securing member may be provided having a ring-shaped resin body into which a circuit board of the rectifier is integrally formed, a plurality of metal stays disposed circumferentially on the outer circumference side of the resin body for integrally securing the tips of the coil segments projecting from the rear end of the stator core to be joined to each other, and insert-conductors integrally formed into the resin body to electrically connect terminals of the circuit board and predetermined stays of the metal stays, the number of component parts can be reduced.

Because heat-radiating fins may be provided on the metal stays, temperature increases in the stator are suppressed and high-performance can be achieved.

What is claimed is:

1. An automotive alternator comprising:
   a shaft supported in a pair of brackets so as to rotate freely;
   a rotor secured to said shaft;
   a stator provided with a cylindrical stator core having a plurality of slots whose grooves extend in an axial direction of said stator core disposed circumferentially around the inner circumferential surface thereof and a stator coil wound into said slots, said stator being secured to said pair of brackets so as to envelop said rotor; and
   a rectifier disposed within said pair of brackets so as to be positioned at the rear end of said rotor,
   wherein said stator coil is constructed by inserting a plurality of coil segments into each of said slots so as to align in rows in the radial direction within said slots;
   each of said coil segments is inserted into each of said slots in a manner that both tips of each coil segment project axially outwards from the stator core, whererin both tips of one coil segment are connected to both tips of another coil segment which is located a predetermined number of slots away
   wherein said coil segments are formed into a shape such that when inserted into said slots from said one coil segment, and, said tips of said one coil segment are in close proximity to and overlap radially with said tips of said another coil segment which is located at a predetermined number of slots away from said one coil segment; and
   wherein an engaging portion is disposed on said tips of said one coil segment projecting axially outwards from said stator core and an engaged portion is disposed on said tips of another coil segment which is located at a predetermined number of slots away from said coil segment, whereby said engaging portions are engaged in said engaged portions to temporarily secure said coil segments to each other after coil segments are inserted into said slots.

2. The automotive alternator according to claim 1, further comprising: a coil securing member comprising:
   a ring-shaped resin body into which a circuit board of said rectifier is integrally formed;
   a plurality of metal stays disposed circumferentially on the outer circumference side of said resin body for integrally securing tips of said coil segments projecting from said rear end of said stator core to be joined to each other, and
   insert-conductors integrally formed into said resin body to electrically connect terminals of said circuit board and predetermined stays of said metal stays.

3. The automotive alternator according to claim 2, wherein heat-radiating fins are disposed on said metal stays.

4. The automotive alternator according to claim 1, wherein each of said coil segments comprises:
   a first straight portion housed in one of said slots having one end projecting from one axial end of said stator core;
   a second straight portion connected to the other end of said first straight portion by means of a single bend and projecting from the other axial end of said stator core; and
   a third straight portion connected to said second straight portion by means of a single bend and extending parallel to said first straight portion.

5. The automotive alternator according to claim 4, further comprising:
   a coil securing member comprising:
      a ring-shaped resin body into which a circuit board of said rectifier is integrally formed;
      a plurality of metal stays disposed circumferentially on the outer circumference side of said resin body for integrally securing tips of said coil segments projecting from said rear end of said stator core to be joined to each other, and
      insert-conductors integrally formed into said resin body to electrically connect terminals of said circuit board and predetermined stays of said metal stays.

6. The automotive alternator according to claim 5, wherein heat-radiating fins are disposed on said metal stays.

7. An automotive alternator comprising:
   a shaft supported in a pair of brackets so as to rotate freely;
   a rotor secured to said shaft;
   a stator provided with a cylindrical stator core having a plurality of slots whose grooves extend in an axial direction of said stator core disposed circumferentially around the inner circumferential surface thereof and a stator coil wound into said slots, said stator being secured to said pair of brackets so as to envelop said rotor;
   a rectifier disposed within said pair of brackets so as to be positioned at the rear end of said rotor; and
   a coil securing member comprising:
      a ring-shaped resin body into which a circuit board of said rectifier is integrally formed;
      a plurality of metal stays disposed circumferentially on the outer circumferance side of said resin body for integrally securing tips of said coil segments projecting from said rear end of said stator core to be joined to each other; and
      insert-conductors integrally formed into said resin body to electrically connect terminals of said circuit board and predetermined stays of said metal stays;
   wherein said stator coil is constructed by inserting a plurality of coil segments into each of said slots so as to align in rows in the radial direction within said slots;
   each of said coil segments is inserted into each of said slots in a manner that both tips of each coil segment project axially outwards from the stator core, wherein both tips of one coil segment are connected to both tips of another coil segment which is located a predetermined number of slots away from said one coil segment, and, said tips of said one coil segment are in close proximity to and overlap radially with said tips of said another coil segment which is located at a predetermined number of slots away from said one coil segment; and wherein heat-radiating fins are disposed on said metal stays.

8. An automotive alternator comprising:

a shaft supported in a pair of brackets so as to rotate freely;

a rotor secured to said shaft;

a stator provided with a cylindrical stator core having a plurality of slots whose grooves extend in an axial direction of said stator core disposed circumferentially around the inner circumferential surface thereof and a stator coil wound into said slots, said stator being secured to said pair of brackets so as to envelop said rotor;

a rectifier disposed within said pair of brackets so as to be positioned at the rear end of said rotor; and a coil securing member comprising:

a ring-shaped resin body into which a circuit board of said rectifier is integrally formed;

a plurality of metal stays disposed circumferentially on the outer circumferance side of said resin body for integrally securing tips of said coil segments projecting from said rear end of said stator core to be joined to each other; and insert-conductors integrally formed into said resin body to electrically connect terminals of said circuit board and predetermined stays of said metal stays;

wherein each of said coil segments comprises:

a first straight portion housed in one of said slots having one end projecting from one axial end of said stator core;

a second straight portion connected to the other end of said first straight portion by means of a single bend and projecting from the other axial end of said stator core; and a third straight portion connected to said second straight portion by means of a single bend and extending parallel to said first straight portion;

wherein said stator coil is constructed by inserting a plurality of coil segments into each of said slots so as to align in rows in the radial direction within said slots; each of said coil segments is inserted into each of said slots in a manner that both tips of each coil segment project axially outwards from the stator core, wherein both tips of one coil segment are connected to both tips of another coil segment which is located a predetermined number of slots away from said one coil segment, and, said tips of said one coil segment are in close proximity to and overlap radially with said tips of said another coil segment which is located at a predetermined number of slots away from said one coil segment; and wherein heat-radiating fins are disposed on said metal stays.

\* \* \* \* \*